United States Patent [19]

Sando et al.

[11] 4,111,434
[45] Sep. 5, 1978

[54] METHOD OF PRESSURE SEAL SIMULTANEOUSLY EMPLOYING AIR-BALANCE OF A HIGH PRESSURE STEAMER AND AN APPARATUS THEREFOR

[75] Inventors: Yoshikazu Sando; Hiroshi Ishidoshiro; Matsuo Minakata, all of Wakayama, Japan

[73] Assignee: Sando Iron Works Co., Ltd., Japan

[21] Appl. No.: 662,233

[22] Filed: Feb. 27, 1976

Related U.S. Application Data

[62] Division of Ser. No. 583,836, Jun. 4, 1975, Pat. No. 4,017,258.

[30] Foreign Application Priority Data

Jun. 10, 1974 [JP] Japan .................................. 49-65819
Jun. 10, 1974 [JP] Japan .................................. 49-65820

[51] Int. Cl.² ........................................... F16J 15/40
[52] U.S. Cl. ........................................... 277/3
[58] Field of Search .............. 68/5 E; 34/242; 118/49, 118/49.1, 50; 277/1, 3, 27, 15

[56] References Cited

U.S. PATENT DOCUMENTS 3,090,134   5/1963   Morrison .................................. 118/50
3,174,230   3/1965   Green et al. ............................ 96/5 E Primary Examiner—Robert I. Smith
Attorney, Agent, or Firm—Toren, McGeady and Stanger

[57] ABSTRACT

A pressure seal apparatus employing air balance of a high pressure steamer in which sealing gas is pressure introduced into an air seal chamber shut off from outer air by a roll seal mechanism installed at the fiber feed in and take out openings of a high pressure steamer vessel body, so that the gas and steam which leaks from within the vessel body into the air seal chamber are bumped or mixed with each other for forming air balance within the vessel body. In the pressure seal apparatus a plurality of small gas chambers are provided in the air seal chamber within the above mentioned vessel body, wherein an exhaust tube for mixed gas of the pressure sealing gas and steam leaking out of the vessel body is connected at least to a small gas chamber at which gas and steam are mixed together, and further a pressure introduction (supply) mechanism for supplying gas into the air seal chamber is provided near the roll seal mechanism.

4 Claims, 9 Drawing Figures

METHOD OF PRESSURE SEAL SIMULTANEOUSLY EMPLOYING AIR-BALANCE OF A HIGH PRESSURE STEAMER AND AN APPARATUS THEREFOR

This is a division of application Ser. No. 583,836 filed on June 4, 1975 and now U.S. Pat. No. 4,017,258.

BACKGROUND OF THE INVENTION

The present invention relates to a pressure seal method for a fiber product feed in and take out parts provided at a high pressure steamer, and a pressure seal apparatus simultaneously employing air balance of a high pressure steamer used in said method.

Heretofore, pressure seal method of a high pressure steamer has had such shortcomings that steam which is pressure introduced into a vessel body of a high pressure steamer has a high temperature during operation making it difficult to retain the atmosphere (pressure, temperature, etc.) of the steam at a state suitable for processing fiber products, further the temperature within vessel body rises due to the high temperature of the steam causing thermal expansion to take place at each sealing member of the device of the steamer. Moreover, as the coefficient of thermal expansion of each of the seal members is different from each other each sealing member placed in pressure contact with each other by great pressure for necessity of sealing gas with high pressure within the vessel chamber has strain deformation, causing pressure seal leakage thus lowering safety of operation, furthermore, durable life of the seal apparatus is shortened, and time, trouble and expenses required for maintenance of apparatus go up, also adversely affecting operating efficiency.

Pressure seal apparatus for a fiber product feed in and take out parts of a high pressure steamer vessel body used in a conventional pressure sealing method ordinarily has such method as providing a roll seal mechanism consisting of such sealing members as a pair of left and right seal rolls rotating in contact with each other, a seal block installed at the fiber feed in and take out openings of vessel body, and intermediate rolls intervening between the seal rolls and the seal block, etc.

However, in a sealing apparatus having such a set-up, the temperature within steamer vessel body rises during operation as mentioned above and each sealing member of the sealing apparatus directly receives the effect of high temperature and causes thermal expansion, causing strain deformation at each sealing member in contact with each other because coefficient of thermal expansion is different from each other and causing pressure seal leakage, thereby it becomes difficult to retain the atmosphere of steam pressure introduced into vessel body at such constant state as suited for processing of fiber products, and the elastic substance for the seal roll becomes fragile because of defects of a mechanism to adjust the change in the atmosphere, etc., shortening the durable life of the seal apparatus.

Furthermore, in a seal apparatus having above mentioned mechanism the pressure contact points between a pair of left and right seal rolls and the sealing member which pressure contacts with circumferential surface of the rolls, that is, the pressure sealing points in the circumferential direction of the rolls are such that the nip planes formed by the seal rolls form almost right angle against the axial centers of the rolls, therefore, the pressure receiving plane of the seal roll circumferential plane to receive the pressure within the vessel is great and the pressure giving force over seal roll required for formation of nip plane needs to be comparatively large. Therefore, driving force for such seal roll becomes large, further the effect over fiber products passing through nip plane also increases.

The present invention is to prevent various shortcomings generated in conventional method and its apparatus in a pressure seal method simultaneously employing air balance of a high pressure steamer and an apparatus to embody said method, and realized a method and an apparatus in which pressure seal operation is done safely and surely, and the roll seal mechanism of the seal apparatus used will not be directly affected by high temperature leaving no fear of deformation and becoming fragile, thus securing a long durable life.

SUMMARY OF THE INVENTION

An object of the present invention is to provide a pressure seal method simultaneously employing air balance of a high pressure steamer that sealing gas is pressure introduced into an air seal chamber, which is shielded from outside air and is provided between a roll seal mechanism installed at a fiber product feed in and take out openings of a high pressure steamer vessel body and the vessel body or inside the vessel body, to have the gas bumped or mixed with steam leaking out from the vessel body into the air seal chamber to form air balance for doubly preventing leakage of high pressure steam within vessel body, further, when inside temperature of vessel body reaches high level the high temperature inside the vessel body will not affect the roll seal mechanism of the seal apparatus.

Another object of the present invention is to provide a pressure seal apparatus simultaneously employing air balance of high pressure steamer which consists of an air seal chamber shielded from outside air by a roll seal mechanism installed at a fiber feed in and take out openings of a high pressure steamer vessel body, a sealing gas pressure introduction mechanism installed near the above mentioned roll seal mechanism for dividing the inside of the above mentioned air seal chamber into a plural number of sections along a route for transferring fiber products to form small gas chambers and connecting an exhaust tube for exhausting mixed gas of pressure sealing gas and steam leaking out of said vessel body at least to a small chamber at which the sealing gas and the steam collide with each other and mix with each other out of the small chambers, further for process introducing the sealing gas into the air seal chamber, a detector to detect atmosphere of steam such as temperature or humidity within each of the small chambers, and an air supply volume automatic regulator provided to regulate pressure supply volume of sealing gas comparing the value detected by the detector and a predetermined value.

In order to overcome such disadvantageous conditions in structure that (1) pressure receiving plane at circumferential plane of the seal roll, increases, (2) pressure giving force to the seal roll required for formation of nip plane becomes comparatively strong, and (3) strong seal roll driving force will be required, etc., which takes place at a conventional pressure seal apparatus mentioned before, in the pressure seal apparatus in the present invention a hollow elastic sealing member having a fiber product passage and forming an arc shape external part is fixedly provided at external plane of the seal block, and a pair of left and right seal rolls are provided in close contact with the external plane of arc shape so that the pressure contact position of the sealing member and the seal roll is made closer to the nip, reducing the pressure receiving plane of the seal roll against the vessel internal pressure for reducing the pressure given to the seal roll required for formation of the nip plane, and at the same time the vessel internal pressure is utilized for making the seal roll to pressure contact with the sealing member so that the sealing member pressure contact the circumferential plane of the seal rolls.

BRIEF DESCRIPTION OF THE DRAWINGS

The drawings show examples of a pressure seal apparatus employing air balance according to the present invention, wherein.

DESCRIPTION OF THE PREFERRED EMBODIMENTS

Details of a pressure seal apparatus simultaneously employing air balance according to the present invention will be explained in reference with examples shown in the drawings.

Figure 1:
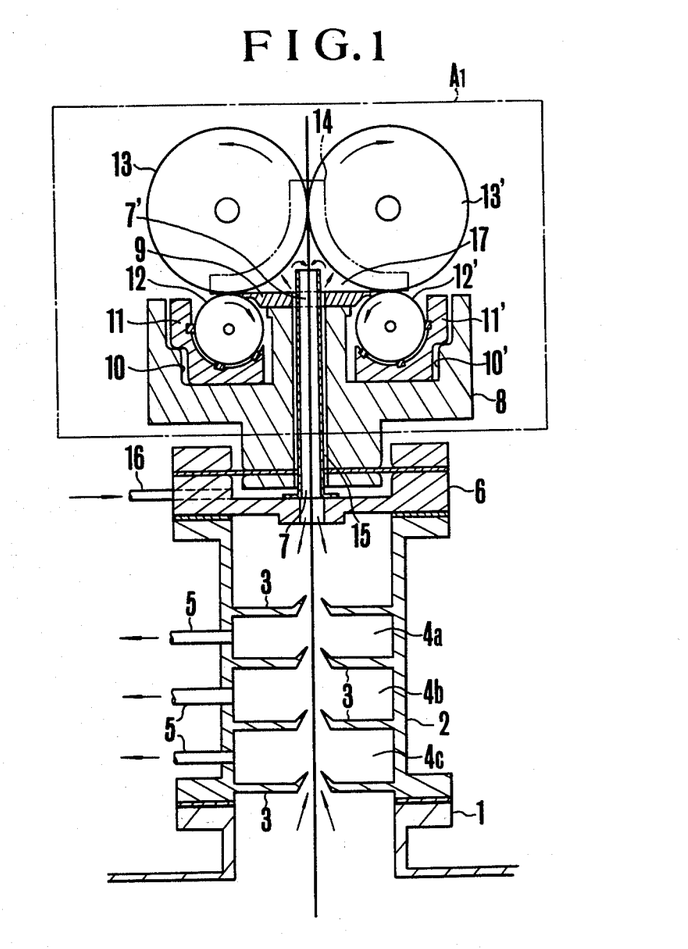
FIG. 1 is a vertical cross section to show a set-up of Example 1.

EXAMPLE 1:

In FIG. 1, the mark 1 is a flange part formed at a fiber product inlet and outlet opening of a high pressure steamer vessel body, and 2 is a tube wall with its lower end fixed at the flange part to form an air seal chamber shielded from external air by a roll seal mechanism $A_1$ (shown by chain line in the drawing) which is installed at its upper end, and this air seal chamber is divided into a plurality of small gas rooms 4 along a fiber products transfer passage by plural number of dividing walls 3 protrudingly provided at both sides of the passage in such manner as forming almost right angle against said passage. Mark 5 shows an exhaust tube connected to each of above mentioned small gas rooms 4, and 6 is a supporting member to flexibly support the roll seal mechanism $A_1$ against the tube wall 2.

The above mentioned roll seal mechanism $A_1$ consists of a seal block 8 having a fiber products passage 7, as flat plane seal liner 9 being installed at the upper plane of the seal block 8 and having a fiber products passage 7', a pair of left and right intermediate rolls 12 12' which are rotatably supported in supporting stands 11 11', respectively within concave parts 10 10' formed at both sides of the fiber products passage 7 which goes through the seal block 8 and are pressure contacted to both side planes of the above mentioned flat plane seal liner 9 respectively along the direction of the generator of circumferential plane, a pair of left and right seal rolls 13, 13' which rotate in pressure contact with the intermediate rolls 12, 12' respectively also in pressure contact with each other, and an end plane seal plate 14 which pressure contacts with the end planes of the seal rolls 13, 13', the circumferential planes of intermediate rolls 12 12' and with the upper plane of the flat plane seal liner 9. Mark 15 shows a sealing gas passage provided at the fiber products passages 7, 7' of the seal block 8, wherein its lower end is connected with a gas pressure introduction device (not shown in the drawing) at the outside, through a sealing gas pressure introduction tube 16 connected with the above mentioned supporting member 6, while its upper end is opened to a space enclosed by the pair of left and right seal rolls 13, 13', the flat plane seal liner 9 and the end plane seal plate 14.

For conducting pressure sealing simultaneously employing air balance using a sealing apparatus with above mentioned set-up, when sealing gas is introduced under pressure from the sealing gas pressure introduction tube 16, the gas flows into the space 17 through the passage 15 and is further introduced into the air sealing chambers 4 within the tube wall 2 through the fiber products passages 7 7'.

On the other hand, steam leaking out of the vessel body comes up to near the lower end of the air seal chambers. Therefore, when the amount of the sealing gas being pressure introduced is suitably determined corresponding to inner pressure of the vessel body, each of the above mentioned small gas chambers within the tube wall 2 forms an atmosphere of a sealing gas chamber 4a, a mixed gas chamber 4b, and a steam chamber 4c respectively in the order from the roll seal mechanism $A_1$ side, thus they can form as a whole an air balance between the sealing gas and the steam within vessel body.

Also since the gas in each of the small gas chambers 4 is exhausted from the exhaust tube 5 respectively, as its exhaust amount is regulated, the atmosphere of steam within the vessel body can be retained constant as there is no leakage in pressure seal from other parts.

According to experimentation tests conducted with above mentioned apparatus, since the air-tightness of vessel body by combined use of the roll seal and air balance seal was enhanced and the amount of steam exhausted from the air balanced part could be easily adjusted, the fiber products could be processed in state under which atmosphere within vessel body was retained constant, thus such effects were realized that loss of heat source was prevented, processing time was shortened and quality of products was enhanced.

When low temperature air was used as sealing gas in the above mentioned experimentation tests each of small gas chambers 4a, 4b, 4c within tube wall 2 was kept in a state of such air balance as showing a distribution of gradual lowering of temperature from the vessel body side to the roll seal mechanism $A_1$, therefore, the high temperature within the vessel body did not affect directly the roll seal mechanism $A_1$ and thermal expansion of each seal member was reduced, while the elastic material used in the seal rolls 13, 13' could be prevented from becoming fragile.

EXAMPLE 2

Figures 2A, 2B, 2C:
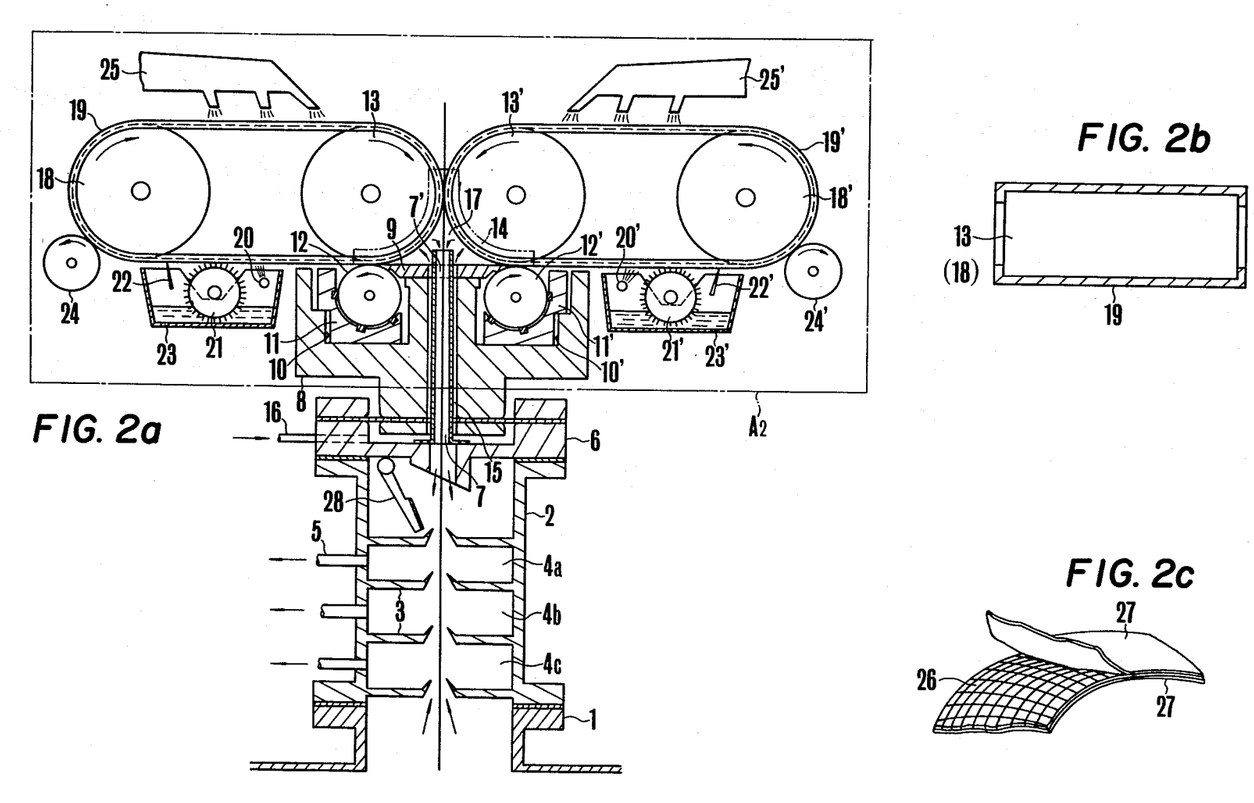
FIG. 2(a) is a vertical cross section showing a set-up of Example 2.
FIG. 2(b) is a drawing for installation of seal belt.
FIG. 2(c), shows a partially enlarged oblique view to show structure of seal belt.

In this example as shown in FIG. 2(a) the roll seal mechanism $A_2$ (shown by chain line) flexibly supported against the tube wall 2 is so made that a pair of left and right seal rolls 13, 13' and rolls 18, 18' corresponding to each of the seal rolls respectively, and left and right seal belts 19, 19' respectively placed around each group of the rolls 13, 18 and of 13', 18' which oppose to each other in left and right are provided, and that the pair of left and right seal rolls 13, 13' form a nip plane through said seal belts 19, 19', also in the revolving process of said seal belts 19, 19', after leaving the nip plane, washing boxes 23, 23' consisting of shower pipes 20, 20', brush rolls 21, 21' and adjusters (doctors) 22, 22' having function of cleaning and removing foreign matter adhering to the belts 19, 19', then a water squeezing rolls 24, 24' and dry boxes 25, 25' for drying and cooling the surfaces of said seal belts 19, 19' are positioned in said order along the revolving direction of the belts 19, 19'.

The above mentioned seal belts 19, 19' have such shape that at least a single layer of expandable net 26 is sandwiched by upper and lower elastic bodies 27 for prevention of thermal expansion and damage as shown in FIG. 2(c).

Mark 28 shows a safety valve which is installed in a rotatable state to the under plane of the supporting member 6 and can contact with said supporting member 6 by its own rotation and can shield the fiber products passage 7 from the air seal chambers, and is so made as reacting to such case that the steam within vessel body generated as the roll seal mechanism $A_2$, etc. has defects suddenly flowing towards the roll seal mechanism $A_2$ side to function.

Since other structures of this apparatus is same as the one shown in Example 1, explanation thereof will be omitted.

When pressure seal is made simultaneously employing air balance by the seal apparatus with the above mentioned set-up, since nip plane at the roll seal mechanism can be formed at any part of the total length of the seal belts 19, 19', therefore the durable life of the roll seal mechanism can be made much longer, further there will be such convenience of easily exchanging and replenishing the seal belts 19, 19'.

Furthermore, since the seal belts 19, 19' has one layer or more of expandable net 26 inserted at its center layer portion, its thermal expansion is remarkably reduced, and as treatment such as cooling is done in the course of its revolving the pressure seal leakage due to the effect of heat within the roll seal mechanism $A_2$ forming the nip plane through said seal belts 19, 19' will be remarkably reduced. Therefore, the air-tightness of steam within vessel body will be much enhanced as mentioned previously.

Further, when there occurs any defects in the roll seal mechanism $A_2$ the above mentioned safety valve 28 functions to shield connection between the fiber products passage 7 and the air seal chamber within tube wall 2, having effect in preventing leakage of steam in the vessel body.

EXAMPLE 3

Figure 3:
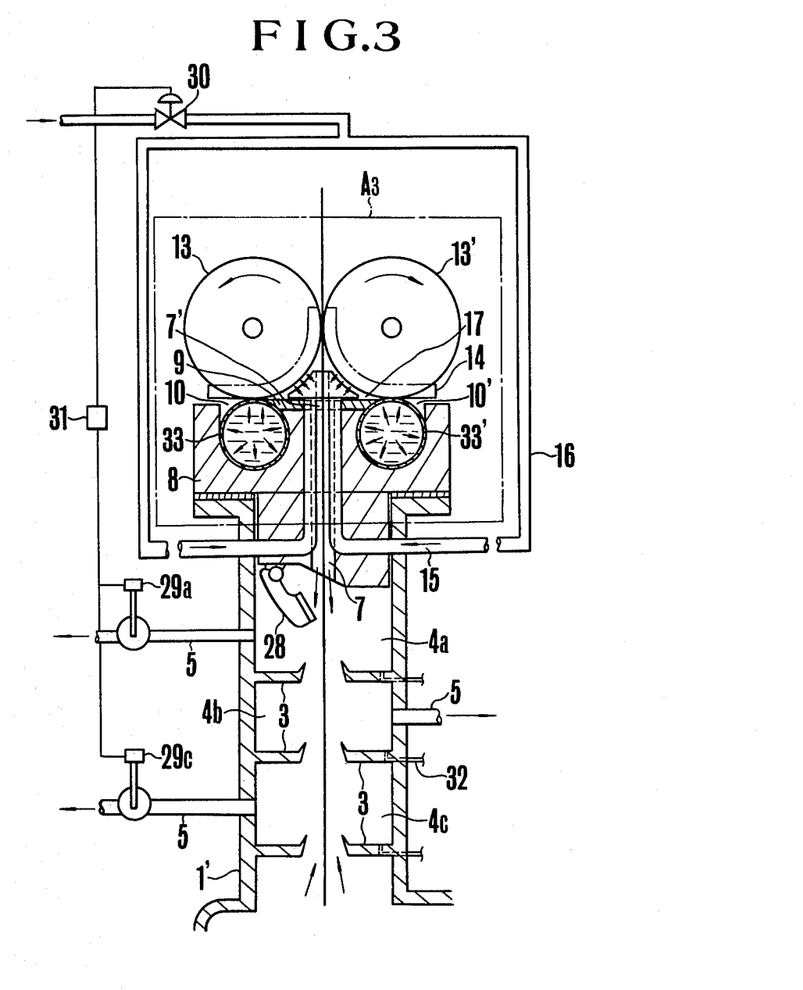
FIG. 3 is a vertical cross section to show set-up of Example 3.

In a pressure seal apparatus of this example as shown in FIG. 3 a flange part 1' protrudingly provided at a fiber products feed in and take out opening of a vessel body is extended to form an air seal chamber, and a roll seal mechanism $A_3$ is installed at the upper end of the same.

Inside of the flange part 1' is divided into plurality of small gas chambers 4 along the fiber products transferring passage by dividing walls 3 protrudingly provided in an almost right angle against the passage as in the Example 1 shown first, and exhaust tubes 5 are connected to each of said small gas chambers 4a, 4b and 4c.

Temperature detectors 29a, 29c to detect the temperature (or humidity) of exhausted gas are installed respectively in each of the exhaust tubes connected to a sealing gas chamber 4a and steam chamber 4c out of the above mentioned exhaust tubes, and signal output terminals of the detectors 29a, 29c are connected to a converter 31 which compares the output signals and pre-set valves to activate a pressure supply amount regulating valve 30 for sealing gas.

Mark 32 is a drain remover to exhaust drain piled up on the surface of the dividing walls 3.

Also in the above mentioned roll seal mechanism $A_3$, water permeable hoses 33, 33' are inserted, respectively, into concave parts 10, 10' at both sides of the fiber products passage 7 which is opened to the upper plane of the left and right seal block 8, and a pair of seal rolls 13, 13' are oppositely provided in such manner that they make close contact with the hoses along the direction of its circumferential generation when water is pressure supplied to the hoses 33, 33'.

A process of forming air balance by the sealing gas in each of small gas chambers 4a, 4b, 4c within the flange part 1' and the steam leaking out of the vessel body into the flange part 1' when pressure seal is done using the above mentioned apparatus will be same as that in the apparatus of Example 1 mentioned before. And when there is variation in said air balance for example for buffering position of the two kinds of gaseous material comes off up or down direction by increase or decrease in internal pressure in vessel body, the temperature detected by the temperature detectors 29a, 29c changes and as the converter 31 detects the temperature change, the regulating valve 30 is activated to adjust the amount of pressure supply of sealing gas so that air balance is always retained at a constant state.

That is, when steam goes up to the roll seal mechanism $A_3$ side the temperature change detected by the detector 29a is detected by the converter 31 to activate the regulating valve 30, thereby the amount of pressure supply of sealing gas is increased, while contrary to this as the sealing gas comes down to the vessel body side, the temperature change detected by the detector 29c is detected by the converter 31 to activate the regulating valve 30 again, thus reducing the amount of pressure supply of sealing gas.

Also the temperature detectors 29a, 29c can be so installed as being able to directly detect the temperature in each of small gas chambers.

EXAMPLE 4

Figure 4:
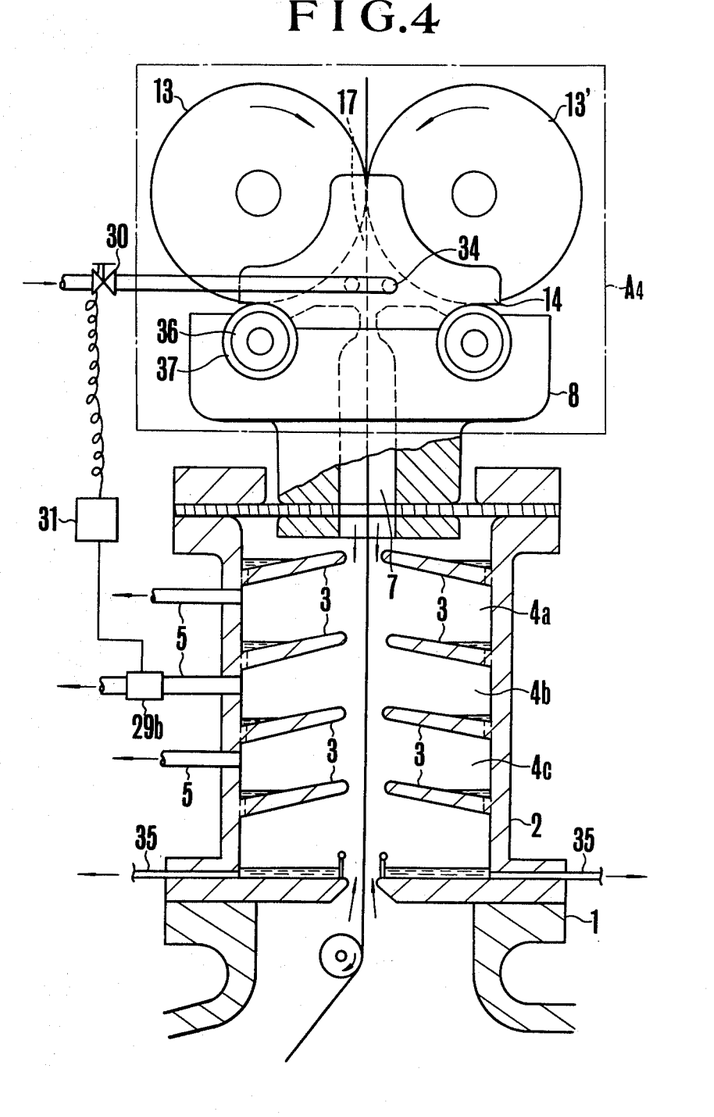
FIG. 4 is a vertical cross section to show set-up of Example 4.

At the apparatus of this example as shown in FIG. 4, sealing gas is pressure supplied by a blow in inlet 34 provided at an end plane sealing plate 14 into a space 17 enclosed by a pair of left and right seal rolls 13, 13' of a roll seal mechanism $A_4$, a seal block 8, and the end plane sealing plate 14. Further, drain stagnating on the surfaces of the plurality of dividing walls 3 forming plural number of small gas chambers 4a, 4b, 4c along the fiber products transferring passage within the tube wall 2 is made to be exhausted by a drain remover 35 provided at the lower end of the tube wall 2 through internal wall surface of said tube wall 2.

Next, for the temperature detection within air seal chamber necessary for retaining air balance always in a constant state, a temperature detector 29b is provided at an exhaust tube 5 connected to the small gas chamber 4b to detect the temperature of mixed gas being exhausted out of said small gas chamber 4a.

In the roll seal mechanism $A_4$ in this example, a pair of left and right intermediate rolls 37, 37' are provided, at concave parts 10, 10' provided at both sides of a fiber products passage 7 which is opened to the upper plane of the seal block 8, in such manner as slidingly fitted with the concave parts 10, 10' respectively, rotatably, and cooling water passage 36, 36' are formed at their inner axial direction. And a pair of left and right seal rolls 13, 13', which pressure contact with the intermediate rolls 37, 37' respectively and also rotate in contact with each other, are provided, and when the above mentioned roll seal mechanism is activated water in the form of dew is deposited on the surface of the intermediate rolls 37, 37' by cooling water flowing through the cooling water passage formed at inside of said intermediate rolls 37, 37', so that the rotation of the seal rolls 13, 13' is lubricated.

When pressure seal simultaneously employing air balance is done using the apparatus with the above mentioned set-up, since sealing gas is to be directly forced into the inside of the roll seal mechanism $A_4$ through the end plane sealing plate 14, it is not necessary to form a sealing gas passage at a fiber products passage 7 of the seal block 8, thus the roll seal mechanism is of such set-up as being able to use conventional type mechanism without modification, therefore the tube wall 2 and the temperature detector 29b etc. illustrated in this example can be installed to a pressure seal apparatus of existing high pressure steamer vessel body.

EXAMPLE 5

Figure 5:
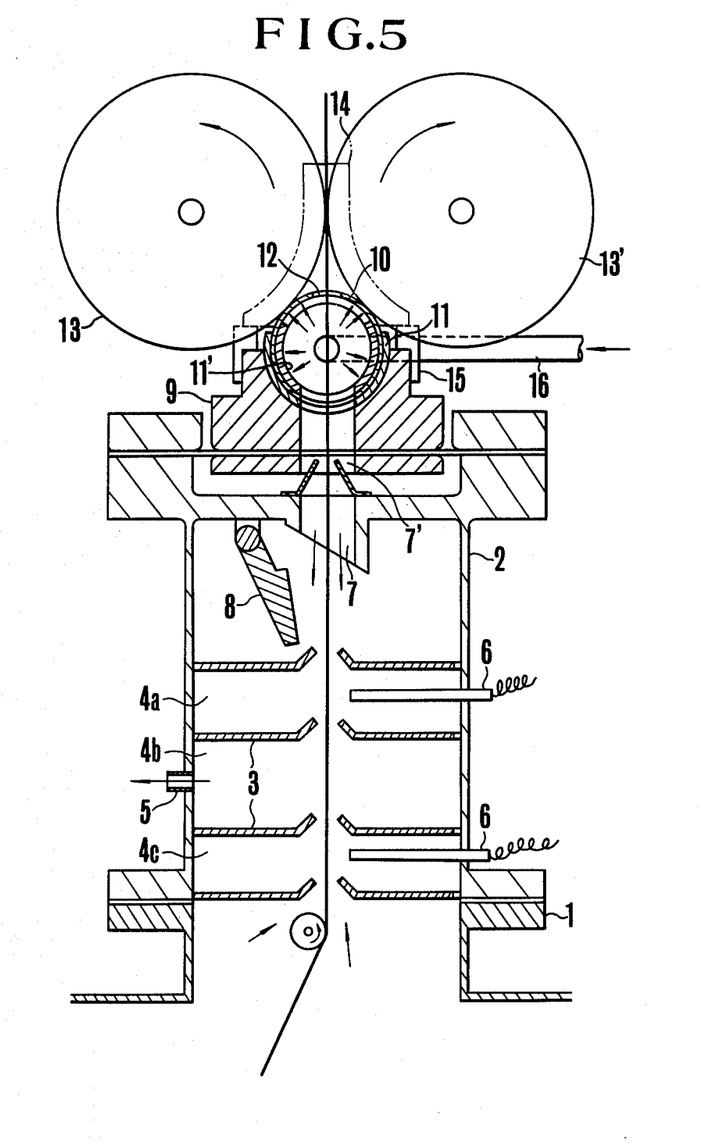
FIG. 5 is a vertical cross section to show set-up of Example 5.

An apparatus of this example has, as shown by FIG. 5, a fiber product outlet flange part 1 of a high pressure steamer vessel body, and a tube wall 2 installed to the flange part 1 to form a plurality of small gas chambers 4 being divided by dividing walls 3 along a fiber products transfer passage, and each of said small gas chambers of the tube wall 2 forms each atmosphere of a sealing gas chamber 4a, a mixed gas chamber 4b, and a vapour chamber 4c by the buffering of the sealing gas being pressure supplied from upper direction and the vapour leaking into the vessel body, in that order, thus forming an air seal state as a whole, further, an exhaust tube 5 is connected to the mixed gas chamber 4b while temperature detectors 6 are provided at the sealing gas chamber 4a and vapour chamber 4c. And a safety valve 8 having a function of tightly closing the fiber products passage 7 formed at upper end of the tube wall 2 is provided at the inside of upper end of the tube wall 2.

Figure 6:
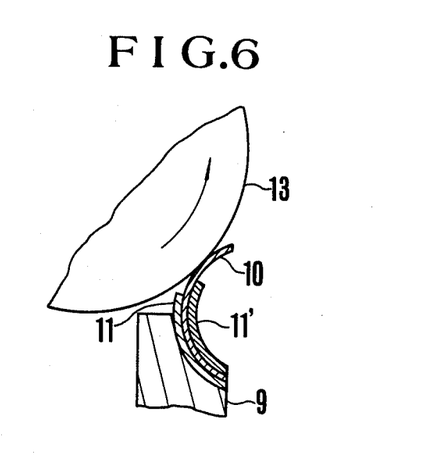
FIG. 6 is a cross section in enlargement of an important part of FIG. 5 showing the state in which a sealing member is intervened between the seal block and the seal rolls.
Figure 7:
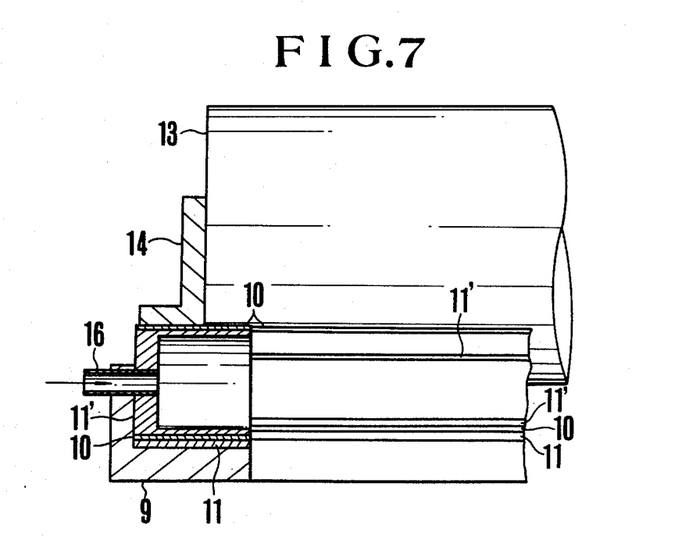
FIG. 7 is a side cross section to show in enlargement the state in which each member shown in FIG. 6 including air pressure inlet tube is so positioned as pressure contacting with each other.

The seal block 9 shown in enlargement in FIG. 6 is flexibly supported at the upper end of the tube wall 2 through a diaphragm packing 10 and a fiber products passage 7' is formed therein. The diaphragm packing 10 is tubular shape elastic sealing member of both ends closed type being attached to upper plane of the seal block 9 by fixing metal fittings 11 11' in such manner as using the fiber products transfer passage as a diameter and having a fiber products passage 12 thereon.

Marks 13, 13' are a pair of left and right seal rolls rotating in close contact with the circumferential surface of the above mentioned tubular shape elastic material at both sides of the fiber products transfer passage along the generation of said plane and in contact with each other. 14 is an end plane sealing plate which is in pressure contact with the end planes of said seal rolls 13, 13' and with circumferential plane of the above mentioned sealing member 10. A supporting member 15 being fixed to the seal block 9 to slidably support the end plane sealing plate 14, and a sealing gas pressure supply tube 16 being connected to inside of the tubular sealing member 10 in such manner as pressure supplying sealing gas are provided.

When a pressure seal apparatus with the above mentioned set-up is used, the tubular shape elastic sealing member 10 pressure contacts with circumferential planes of the seal rolls 13, 13' by sealing gas pressure supplied by the pressure supply tube 16, and the pressure contacting state is further tightened by elasticity of said sealing member, thus pressure seal in circumferential direction of the seal rolls 13, 13' are formed, respectively. Furthermore, the above mentioned pressure sealing position is in such positional relationship with almost 45° against the nip plane for the axial center of said seal rolls 13, 13', therefore, the pressure receiving plane for internal pressure of the seal rolls 13, 13' is halved compared to conventional pressure seal apparatus, and the pressure giving force to the seal rolls 13, 13' making such function as providing necessary nip width to the nip plane is remarkably reduced.

While this example shows a pressure seal apparatus at a fiber products outlet side, wherein there will be no fear at all of the tubular shape elastic sealing member 10 which has a fiber products passage 12 in a rotating direction of the seal rolls 13, 13', being bitten into the rotation of the seal rolls 13, 13', even in a pressure seal apparatus at inlet side which is not shown in the drawing, the above mentioned elastic sealing member 10 is so formed as warping against the circumferential direction of the seal rolls 13, 13' and is connected at both ends sides of fiber products passage 12 and forms tubular shape, generating such supporting force as being able to resist against biting in by rotation of the seal rolls 13, 13' with the shape. Therefore, when coefficient of elasticity of the above mentioned tubular shape elastic sealing member 10 is suitably selected, bite-in accidents by the rotation of seal rolls 13, 13' can be prevented.

As explained in the above mentioned Examples 1 to 5, a pressure seal method simultaneously employing air balance in a high pressure steamer and an apparatus therefor according to the present invention have such set-up that sealing gas is pressure supplied into an air seal chamber is shielded from external air by roll seal mechanisms installed at fiber products feed in and take out openings of a high pressure steamer vessel body, wherein the sealing gas and steam leaking from the vessel body into the air seal chamber are made to buffer with each other to form air balance, and the air-tightness within the vessel body is remarkably enhanced compared to that in a conventional pressure seal apparatus, making it easy to retain atmosphere within the vessel body at a constant state at the time of processing of fiber products. Particularly in an apparatus shown in Example 5, the pressure receiving plane of the seal rolls against the internal pressure within vessel body is remarkably reduced, and based on the reduction of pressure giving force required for providing necessary nip width on the nip plane formed by the above mentioned pair of left and right seal rolls and on the reduction of frictional resistance of said seal rolls, driving power energy is saved and operating cost is lowered, further,- there is such great practical advantages that loss of heat source becomes nil, yet processing time is shortened, quality of product processing is improved, further the effect on the fiber product passing through the nip plane of said seal rolls is reduced, etc.

Furthermore when low temperature air is used as sealing gas such advantages are added that the effect over the roll seal mechanism by high temperature within vessel body is remarkably lowered and the durability life of the seal rolls, etc using elastic material is extended, etc.

What is claimed is:

1. A pressure seal apparatus employing air balance for a high pressure steamer comprising a roll seal mechanism forming one a fiber products take out and feed in opening, means forming an elongated air seal chamber opening at one end to said roll seal mechanism and arranged at the other end for connection to a high pressure steamer, the interior of said air seal chamber forming a duct-like passage for conveying the fiber products between the steamer and said roll seal mechanism, said means including dividing walls extending transversely of said duct-like passage and spaced apart in the elongated direction of the passage for forming a plurality of serially arranged gas chambers with adjoining gas chambers being open to one another so that the fiber products can pass serially through the chambers in passing between the steamer and said roll seal mechanism, means for supplying a pressurized sealing gas into the end of said duct-like passage adjacent to said roll seal mechanism so that the sealing gas and the steam from within the steamer intermix in the range of said gas chambers, said gas chambers comprising at least three said chambers, one adjacent said roll seal mechanism end of said passage, one adjacent the steamer end of said passage and third said chamber located between the other two, an exhaust tube connected to the third one of said gas chambers for removing mixed sealing gas and steam therefrom to a point exteriorly of said duct-like passage.

2. A pressure seal apparatus according to claim 1, which is characterized by having a detector to detect one of temperature and humidity in each of said gas chambers of the air seal chamber and an automatic regulator for air supply amount connected to each said detector to regulate the supply of sealing gas by comparing the value detected by said detector and pre-set value.

3. A pressure seal apparatus according to claim 1, which is characterized by having a detector to detect one of temperature and humidity in each of said gas chambers of the air seal chamber and an automatic regulator for air supply amount connected to each said detector to regulate the supply of sealing gas by comparing the value detected by said detector and a pre-set value.

4. A pressure seal apparatus according to claim 1, wherein said roll seal mechanism comprises seal blocks installed at the fiber product take out and feed in openings of the high pressure steamer vessel body and having fiber product passages, said seal blocks having an external plane facing outwardly away from said duct-like passage, hollow elastic sealing members being installed in the external plane of said seal blocks and having fiber product passages and having external plane parts of arc shape, left and right seal rolls closely contacting with the external arc shape part of said elastic sealing member on opposite sides of the fiber products passage and rotating in contact with each other, and end plane sealing plates in pressure contact with the end planes of said seal rolls and with the arc shape external planes of said elastic sealing member.

* * * * *